United States Patent Office 3,437,301
Patented Apr. 8, 1969

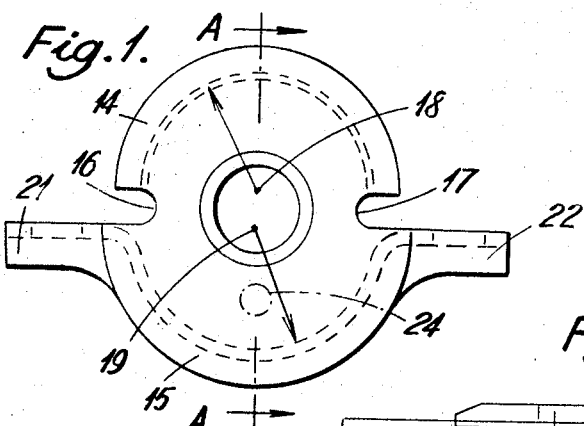
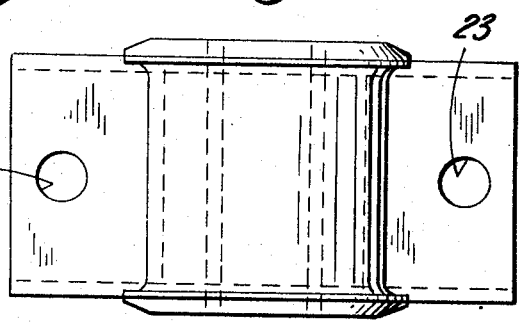
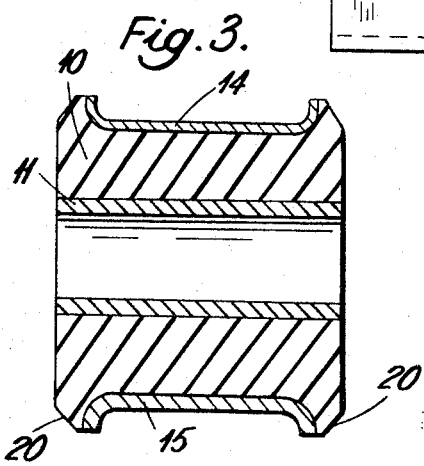
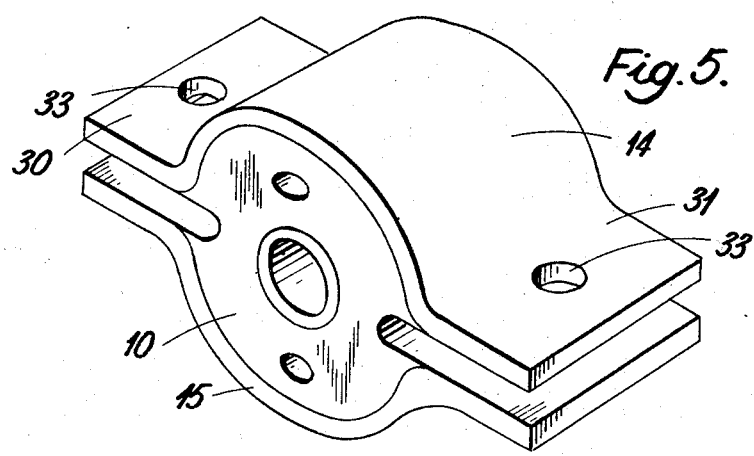

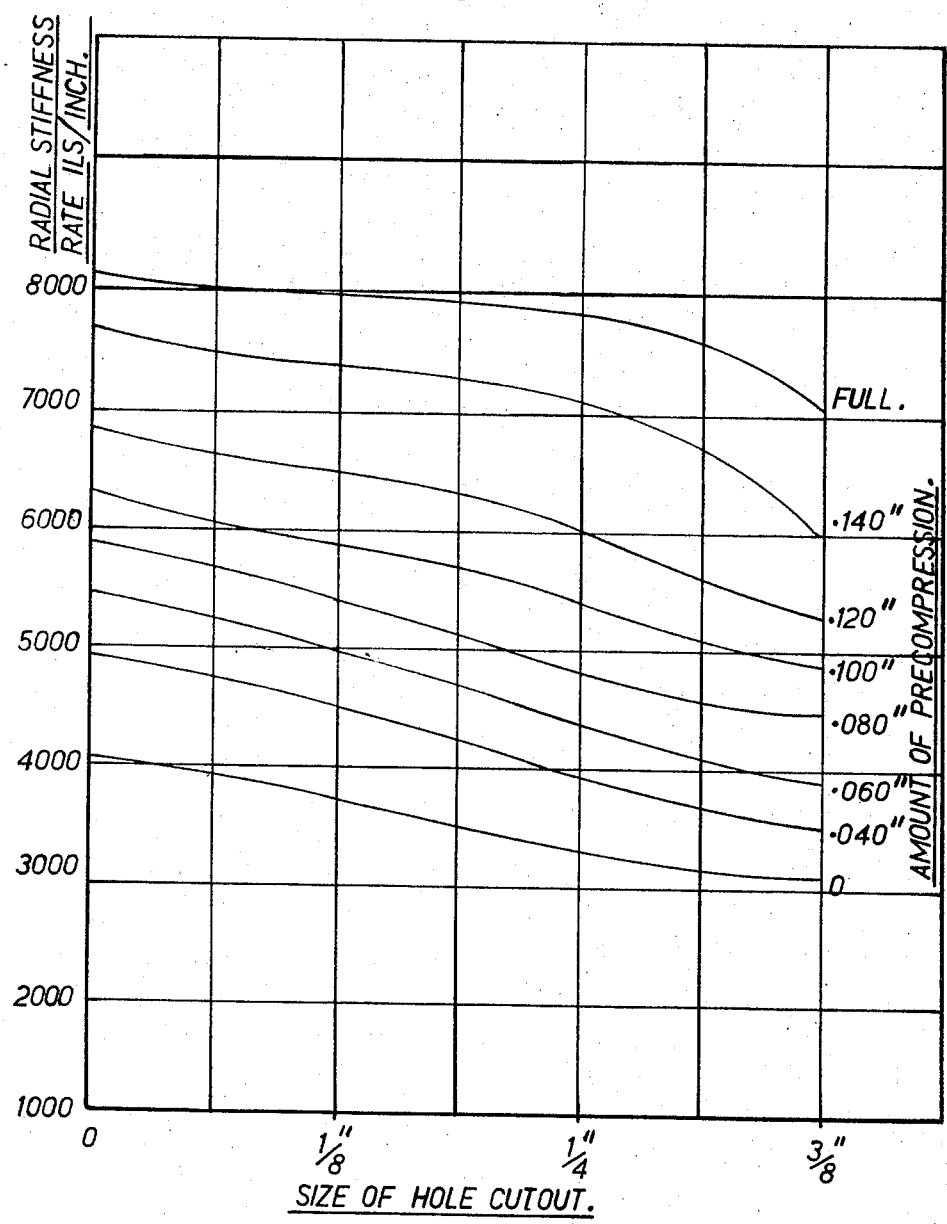

3,437,301
RESILIENT MOUNTINGS
Samuel Alfred Newberry, Rosliston, and William Robert Brake, Burton-on-Trent, England, assignors to BTR Industries Limited, a company of Great Britain
Filed Feb. 1, 1967, Ser. No. 613,232
Claims priority, application Great Britain, Feb. 2, 1966, 4,644/66
Int. Cl. F16b *15/04*
U.S. Cl. 248—358        6 Claims

ABSTRACT OF THE DISCLOSURE

A resilient mounting comprising an annulus of elastomeric material with a rigid outer sleeve bonded to the outer circumference, the outer sleeve being divided into at least two separate arcuate portions and the portions being spaced from one another circumferentially of the annulus whereby the portions may be pressed towards one another to compress the annulus and thereby adjust the radial spring rate.

---

The invention relates to resilient mountings of the type comprising an annulus of elastomeric material with a rigid outer sleeve bonded to the outer circumference of the annulus. The invention is characterized by the provision of an improved resilient mounting of the type defined in which the radial spring rate can be readily adjusted without appreciable altering the axial spring rate. This is made possible by dividing the rigid outer sleeve into at least two separate arcuate portions which are circumferentially spaced from one another, the construction being such that the portions may be pressed towards one another by varying amounts by externally clamping means, i.e., by mounting bolts, or the like, to thereby compress the annulus and, hence, alter the radial spring rate.

There may be a hole or holes through the annulus and extending parallel to its axis.

Preferably there is a rigid inner sleeve bonded to the inner periphery of the annulus.

The annulus may have a portion of reduced radial thickness in the regions between the portions of the outer sleeve.

The profiles of the end faces of the annulus may be of any desired shape.

There may be flanges on the ends of at least one of the portions of the outer sleeve.

The outer sleeve may have turned over edges to provide snubbing means between the extended bonded end faces of the resilient annulus.

Two specific examples of resilient mountings according to the invention will now be described with reference to the accompanying drawings in which:

FIGURE 1 is a side view of the first mounting,
FIGURE 2 is a plan view of the mounting shown in FIGURE 1,
FIGURE 3 is a section on the line A—A in FIGURE 1,
FIGURE 4 is a graph showing test results on the mounting shown in FIGURES 1 to 3, and
FIGURE 5 is a perspective view of a second mounting.

The mounting shown in FIGURES 1 to 3 comprises an annulus 10 of elastomeric material such as rubber and an inner sleeve 11 bonded to the inner periphery of the annulus. An outer sleeve comprises two arcuate portions 14 and 15 each bonded to the outer circumference of the annulus.

The outer sleeves are provided with turned over edges to which the end faces of the annulus are bonded, to provide a snubbing means.

As shown in FIGURE 1 the two portions 14 and 15 are spaced from one another circumferentially of the annulus and the annulus is cut away at 16 and 17 in the two gaps between the two portions 14 and 15. It can also be seen from FIGURE 1 that the portion 14 is arcuate about a point 18 and the portion 15 is arcuate about a point 19.

As can be seen from FIGURE 3 the portions 14 and 15 each have a C-shaped cross-section and the annulus 10 is cut away to receive each of the portions. The edge of the annulus is chamfered at 20.

The portion 15 is provided with two flanges 21 and 22 each provided with a through hole 23.

If desired the annulus may be provided with a hole or holes 24 shown in chained lines in FIGURE 1 extending parallel to the annulus. The hole or holes may be of any desired size or shape.

The end faces of the elastomeric annulus may be of any desired shape and may be identical or asymmetrical depending upon the specific application requirements.

In use of the mounting a suitable clamping member is placed within the groove formed by the C-shape of the portion 14 and is provided with suitable clamping screws which go through the holes 23 in the portion 15. Accordingly the radial stiffness of the mounting may be varied by adjusting the screws in the holes 23 to move the portions 14 and 15 towards and away from one another to compress the annulus 10.

FIGURE 4 shows the results of a series of tests carried out using the mounting of FIGURES 1 to 3 and with an annulus 10 composed of natural rubber with 40° shore hardness. In the figure each transverse line represents the varying amounts of pre-compression of the members 14 and 15, the vertical scale represents the radial stiffness rate in lbs. per inch and the horizontal scale represents the size of the hole 24 in the annulus 10.

From the graph it can be seen that the radial rate of the mounting can be changed easily and at the same time from a similar graph it can be shown that the axial rates are not changed unduly as the portions 14 and 15 are compressed together. This enables the natural frequency of the unit in a radial direction to be adjusted and to produce a detuning of the device.

It has been found that a definite mathematical relationship exists between the size of the hole 24, the amount of pre-compression and the radial rate enabling a unit to be designed with a certain ratio of rates in the three principal planes and also provide the ability to alter the rate in the radial direction without substantially affecting the other two rates.

The mounting illustrated in FIGURE 5 is similar to the mounting shown in FIGURES 1 to 3 in all respects except that the parts 14 and 15 are of plate form instead of having a C-shaped cross-section and the part 14 is also provided with flanges 30 and 31 having holes 33 for the passage of clamping bolts.

The mounting illustrated in FIGURE 5 is suitable for use as a body mounting in a motor vehicle.

We claim:
1. A resilient mounting comprising an annulus of elastomeric material, a rigid outer sleeve bonded to the outer circumference of the annulus, the outer sleeve being divided into at least two separate arcuate portions and the portions being spaced from one another to provide for adjustable compression of the elastomeric annulus by pressing the said arcuate portions toward one another, the annulus having a portion of reduced radial thickness in the regions between the portions of the outer sleeve.

2. A resilient mounting as claimed in claim 1 in which there is at least one hole through the wall of the annulus extending parallel to the axis.

3. A resilient mounting as claimed in claim 1 in which there is a rigid inner sleeve bonded to the inner periphery of the annulus.

4. A resilient mounting as claimed in claim 1 in which there are flanges on the ends of at least one of the portions of the outer sleeve.

5. A resilient mounting as claimed in claim 1 in which the outer sleeve portions have turned over edges to which the resilient annulus is bonded to form a snubbing face.

6. A resilient mounting comprising an annulus of elastomeric material, at least one hole through the wall of the annulus extending parallel to the axis of the annulus, a rigid inner sleeve bonded to the inner periphery of the annulus, a rigid outer sleeve bonded to the outer circumference of the annulus, the outer sleeve being divided into at least two separate arcuate portions and the portions being spaced from one another circumferentially of the annulus, the outer circumference of the annulus being cut away in the spaces between the said portions, and flanges on the ends of at least one of the portions of the outer sleeve, the said mounting being adapted to have the outer sleeve portions pressed towards one another to compress the annulus thereby varying the radial stiffness rate of the mounting without varying substantially its actual stiffness rate.

References Cited

UNITED STATES PATENTS

| | | | |
|---|---|---|---|
| 2,251,416 | 8/1941 | Parker | 287—85 X |
| 2,880,027 | 3/1959 | Everitt et al. | 287—85 |

OTHER REFERENCES

Ser. No. 304,633, M.F.A. Julien (A.P.C.), published May 25, 1943.

JOHN PETO, *Primary Examiner.*

U.S. Cl. X.R.

287—85